US008780277B2

(12) United States Patent
Williams et al.

(10) Patent No.: US 8,780,277 B2
(45) Date of Patent: Jul. 15, 2014

(54) TELEVISION RECEIVER, TELEVISION CONTROLLER CIRCUITRY AND METHOD

(71) Applicants: Sony Corporation, Tokyo (JP); Sony Europe Limited, Weybridge (GB)

(72) Inventors: David Williams, Cardiff (GB); Stephen Beck, Hook (GB); John Nicholas Wilson, Hook (GB); James Kenneth Alexander Ritchie, Basingstoke (GB)

(73) Assignees: Sony Corporation, Tokyo (JP); Sony Europe Limited, Weybridge (GB)

( * ) Notice: Subject to any disclaimer, the term of this patent is extended or adjusted under 35 U.S.C. 154(b) by 0 days.

(21) Appl. No.: 14/092,018

(22) Filed: Nov. 27, 2013

(65) Prior Publication Data

US 2014/0085544 A1    Mar. 27, 2014

Related U.S. Application Data

(63) Continuation-in-part of application No. 13/826,651, filed on Mar. 14, 2013, now Pat. No. 8,643,789.

(30) Foreign Application Priority Data

May 22, 2012   (GB) .................................. 1209000.7

(51) Int. Cl.
*H04N 5/50*   (2006.01)
*H04N 5/38*   (2006.01)

(52) U.S. Cl.
USPC .............................. 348/732; 348/21; 348/731

(58) Field of Classification Search
USPC .................. 348/21, 725, 726, 607, 731, 732; 455/296, 302, 307; 375/346, 350
See application file for complete search history.

(56) References Cited

U.S. PATENT DOCUMENTS

| 5,661,528 A | 8/1997 | Han |
| 5,777,692 A | 7/1998 | Ghosh |

(Continued)

FOREIGN PATENT DOCUMENTS

| JP | 2010-187154 | 8/2010 |
| WO | 2007/044124 A2 | 4/2007 |

(Continued)

OTHER PUBLICATIONS

Great Britain Search Report issued Oct. 18, 2012, in Patent Application No. GB 1209000.7, filed May 22, 2012.

*Primary Examiner* — Victor Kostak
(74) *Attorney, Agent, or Firm* — Oblon, Spivak, McClelland, Maier & Neustadt, L.L.P.

(57) ABSTRACT

A television receiver for receiving TV signals when unknown interference is present in a predetermined bandwidth in which the TV signals are transmitted. The TV receiver comprises an input, a tuner, a configurable filter and a controller circuitry. The input receives a radio frequency (RF) signal comprising the terrestrial TV signals. The tuner is configured to detect the terrestrial TV signals, where the terrestrial TV signals include a plurality of frequency channels within a predetermined bandwidth and the plurality of frequency channels provide TV signals which communicate TV channels. The configurable filter is configurable to suppress signals received from one or more of the plurality of frequency channels within the predetermined bandwidth. The controller circuitry is operable to form a channel map of the TV channels detected by the tuner for selection by a user of the television set and consequent upon a TV channel not being detected on a frequency channel, configure the frequency domain filter to suppress signals received from the frequency channel.

21 Claims, 15 Drawing Sheets

(56) References Cited

U.S. PATENT DOCUMENTS

| | | | |
|---|---|---|---|
| 6,697,098 B1 * | 2/2004 | Wang | 348/21 |
| 7,054,562 B1 | 5/2006 | Balakrishnan et al. | |
| 7,526,201 B2 * | 4/2009 | Mohs et al. | 398/37 |
| 7,881,611 B2 * | 2/2011 | Mohs et al. | 398/32 |
| 7,995,147 B2 * | 8/2011 | Diemer | 348/607 |
| 8,594,228 B2 * | 11/2013 | Sorrells et al. | 375/295 |
| 2002/0085124 A1 | 7/2002 | Doetsch et al. | |
| 2010/0017835 A1 | 1/2010 | Wilson et al. | |
| 2011/0096241 A1 | 4/2011 | Ahluwalia et al. | |
| 2011/0242428 A1 | 10/2011 | Blouin et al. | |
| 2012/0026407 A1 | 2/2012 | Zhang et al. | |
| 2012/0313731 A1 | 12/2012 | Burgener et al. | |
| 2013/0039444 A1 | 2/2013 | Porret et al. | |

FOREIGN PATENT DOCUMENTS

| | | |
|---|---|---|
| WO | 2007/044124 A3 | 4/2007 |
| WO | 10-2008-0017691 A | 2/2008 |
| WO | 2009/096990 A1 | 8/2009 |
| WO | 2010/101833 A1 | 9/2010 |

* cited by examiner

TELEVISION RECEIVER, TELEVISION CONTROLLER CIRCUITRY AND METHOD

CROSS REFERENCE TO RELATED APPLICATION

The present application is a Continuation-in-Part application of U.S. patent application Ser. No. 13/826,651, filed Mar. 14, 2013, which claims priority to GB patent application No 1209000.7, filed in the UKIPO on 22 May 2012, the entire contents of which being incorporated by reference.

FIELD OF THE INVENTION

The present invention relates to television receivers, television controller circuitry and methods for receiving television signals.

BACKGROUND OF THE INVENTION

The electromagnetic spectrum is a scarce resource and due to a rapidly increasing number and variety of devices that communicate wirelessly it is in significant demand. Consequently, portions of useful spectrum are allocated to specific uses to try to ensure reliable operation of wireless devices. Uses of electromagnetic spectrum include mobile telecommunications, terrestrial and satellite television (TV), WIFI, radio and wireless microphones etc. Due to a scarcity of spectrum, frequency allocations often change. Furthermore frequency gaps or guard bands between frequency bands allocated to systems which transmit and receive within those frequency bands for different uses can decrease which can thereby increase in-band and out-of-band interference. A change in frequency allocations and decreasing guard bands can lead existing devices to experience increased interference and may in some examples result in the devices being unable to receive signals for which they were designed.

Terrestrial TV broadcasts have traditionally been allocated a significant portion of frequency spectrum. However, as demand for spectrum increases and alternative methods for receiving TV content gain in popularity, there is a drive from other spectrum users to utilise portions of the spectrum which have traditionally been allocated to terrestrial W. Additionally, in for example the UK and across the EU, a switch from analogue to digital terrestrial TV has led to spectrum traditionally allocated to terrestrial TV being freed up for use by mobile telecommunications, particularly for example 3GPP Long Term Evolution (LTE). These factors have led to mobile telecommunications signals being transmitted in close proximity in the frequency domain to terrestrial TV signals and being transmitted over frequencies previously allocated to terrestrial TV. Furthermore, due to extra revenue that mobile telecommunications can provide and increasing capacity required, frequencies allocated to mobile communications may further encroach into or close to frequencies which have been previously allocated to terrestrial TV. Furthermore this allocation may change dynamically. Consequently TV receivers will be required to receive terrestrial TV signals when locations of the TV signals in the frequency domain are close to frequency bands in which signals for other uses are transmitted.

SUMMARY OF INVENTION

According to the present invention there is provided a television receiver for receiving television (TV) signals. The TV receiver comprises an input, a configurable filter, a tuner and a controller. The input receives a radio frequency (RF) signal comprising the terrestrial TV signals. The tuner is configured to detect the terrestrial TV signals, the terrestrial TV signals including a plurality of frequency channels within a predetermined bandwidth and each of the plurality of frequency channels provides TV signals which communicate a TV channel. The configurable filter is configurable to suppress signals received from one or more of the plurality of frequency channels within the predetermined bandwidth. The controller is operable to form a channel map of the TV channels detected by the tuner for selection by a user of the TV receiver and consequent upon a TV channel not being detected on a frequency channel, to configure the configurable filter to suppress signals received from the frequency channel.

Embodiments of the present invention can provide an arrangement for reducing the effects of interference caused by signals for other uses being transmitted in one or more frequency bands which overlap with a bandwidth a TV receiver. These frequency bands may be contiguous or non-contiguous and time variant. For example TV channels may each have a bandwidth of 8 MHz, which are in fact 7.61 MHz allowing for guard bands. In some examples, there may be notches in the frequency channel where certain frequencies are avoided. In other examples, an interferer may be more than one 8 MHz frequency channel slot away and still provide out of band interference. Certain tuner architectures may be more susceptible than others. Therefore an interferer which produces interference in a frequency channel which is adjacent to a frequency channel in which a TV channel is being transmitted may introduce interference and in this respect "adjacent" includes all of the above examples.

Embodiments of the present invention can provide a TV receiver, which includes a configurable filter, which suppresses signals received within one or more frequency channels in which sources of interference, such as LTE signals, are being transmitted. The configurable filter suppresses for example interfering signals from a frequency channel in which no TV signal is being transmitted which is adjacent to a channel in which a TV signal is being transmitted. Suppression of a frequency channel on which no TV signals are being transmitted can thereby improve a likelihood that the TV receiver can detect and recover a TV channel from a frequency channel. The TV receiver includes a controller which infers the presence of interference on a frequency channel by a failure to detect a TV channel on the frequency channel. The controller subsequently configures the configurable filter to suppress signals being received from frequency channels upon which no TV channels have been detected. This approach is based on a presumption that if a TV channel is not detected on a frequency channel, interference is present on the frequency channel. Consequently, the controller requires no prior information on a location of a source of interfering signals and does not need to detect the interfering signals themselves.

Supressing any interfering signals which may be present on a frequency channel can have an effect of improving the detection of a TV channel in a neighbouring frequency channel. This is because interfering signals in neighbouring channels may cause out-of-band interference, for example when the interfering signals have a significantly higher power than the neighbouring TV signals. In this example out-of-band interference is caused by a high-power interferer being transmitted on a frequency channel upon which no TV signals are transmitted but which is within the predetermined bandwidth, and therefore the receiver's bandwidth. The high-power interfering can overload (also known as saturation or blocking of)

a low-noise amplifier in the receiver such that the low-noise amplifier may introduce distortions into the received RF signal across the predetermined bandwidth. These distortions may then lead the receiver to be unable to detect TV channels on frequency channels within the predetermined bandwidth, for example TV channels on frequency channels neighbouring frequency channels upon which the interfering signal are transmitted.

According to some embodiments the configurable filter is internal to the TV receiver and can be fabricated in silicon as part of an on chip receiver component and integrated into an existing TV receiver design at a relatively low cost. The configurable filter can therefore be placed in receivers in newly produced TV sets at a relatively low cost. Therefore the newly produced TV sets can detect TV channels across the predetermined bandwidth when the location and source of TV signals and interfering signals is not known. This is advantageous for example when TV sets are distributed across different geographical regions where frequencies allocated to terrestrial TV signals and interfering signals, such as LTE signals, differ. This is also advantageous for example when frequency allocations within a geographical region may change or may be allocated dynamically.

According to another embodiment the TV receiver includes a filter bypass which is configurable by the controller. The filter bypass is operable to form a signal path for the input RF signal to the tuner that bypasses the configurable filter. The filter bypass enables the tuner to receive the TV signals without the TV signals passing through the configurable filter, which thereby avoids any suppression of signals where the TV receiver is deployed in a region or an application for which it is known that there are no interfering signals present. For example when the TV receiver is arranged to receive TV signals from a cable or from a peripheral device. This provides an advantage because by removing the configurable filter from the RF signal path of the TV signals to the tuner, a possible loss of signal power may be avoided. A further benefit may arise because the controller is not required to configure the configurable filter and thus the controller may perform fewer computational operations.

According to another embodiment of the present invention the controller within the TV receiver is operable to configure the configurable filter to suppress signals received from one or more frequency channels that are adjacent to the frequency channel on which the tuner is currently configured to detect TV channels.

The suppression of signals received from one or more frequency channels adjacent to a frequency channel on which the tuner is currently configured to detect TV channels can result in sources of interference being suppressed prior to TV channel detection. Specifically, signals received from frequency channels upon which TV channel detection has not been performed are suppressed before TV channel detection is performed on a frequency channel. This method of operation can increase a probability that reliable TV channel detection will be achieved because unknown interfering signals are suppressed prior to TV channel detection.

According to another embodiment of the present invention the terrestrial TV signals comprise service information (SI). The SI comprises information specifying the frequency channels upon which TV channels being transmitted. The controller is operable to receive the SI and configure the frequency domain filter to suppress signals received from the frequency channels on which the service information specifies television channels are not being transmitted. In some examples, SI may include physical layer signalling which carries information on what frequency channels are being used for the transmission of TV channels.

The reception and utilisation of SI can enable reliable detection of TV channels, for example when interfering signals are allocated a band of frequencies above a band of frequencies allocated to terrestrial TV signals. This is achieved by configuring the configurable filter to suppress signals received from frequency channels upon which no TV channels are provided based on information provided by the SI before TV channel detection takes place. The suppression of signals received from frequency channels upon which no TV signals are provided increases the probability that reliable TV channel detection will be achieved because interfering signals are suppressed prior to TV channel detection.

Various aspects and features of the invention are defined in the appended claims, which include a method of receiving TV signals and a controller.

BRIEF DESCRIPTION OF THE DRAWINGS

Embodiments of the present invention will now be described by way of example only with reference to the accompanying drawings wherein like parts are provided with corresponding reference numerals and in which.

DESCRIPTION OF EXAMPLE EMBODIMENTS

Figure 1:
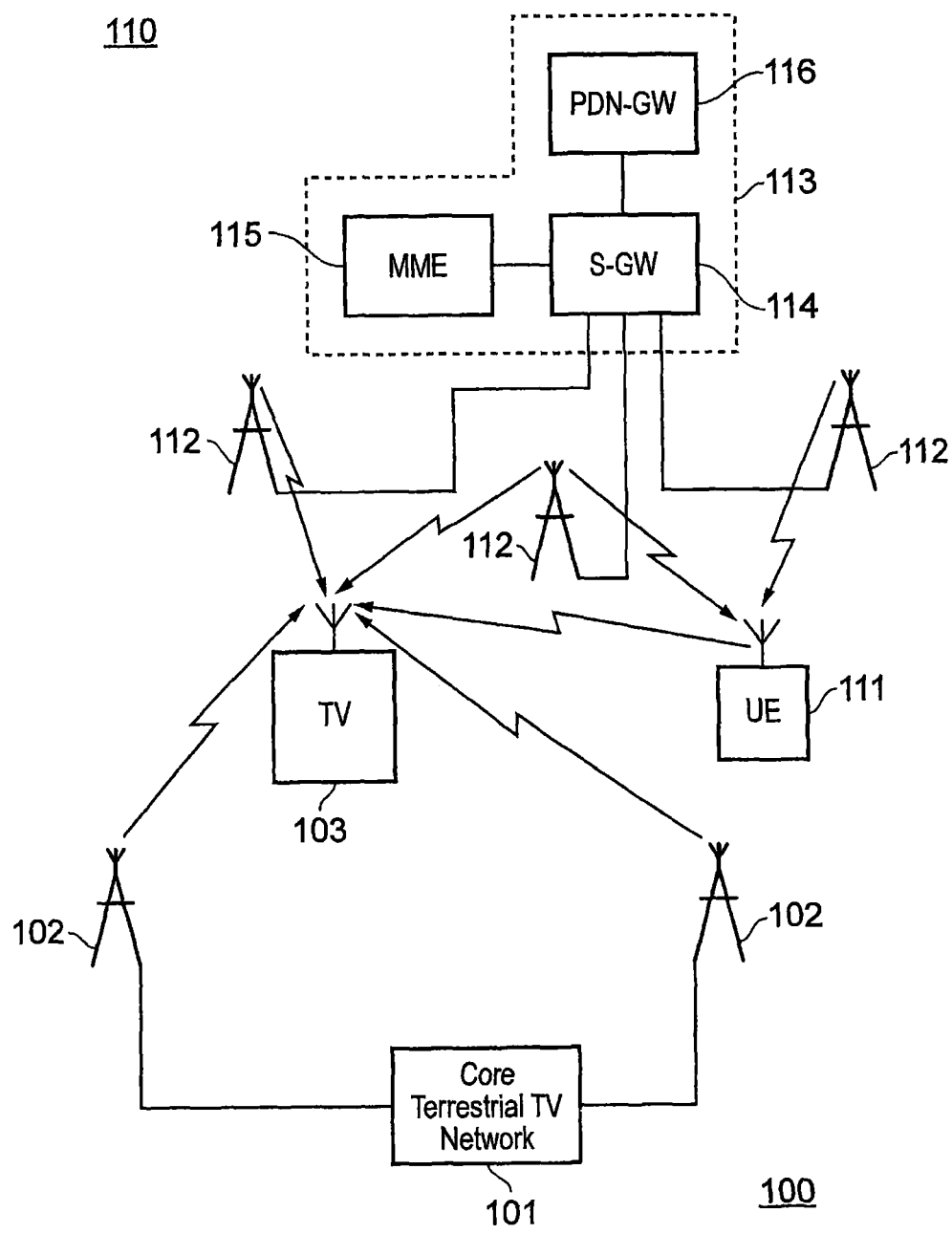
FIG. 1 provides a simplified diagram of an example scenario comprising a terrestrial TV network and an LTE network in which example embodiments of the present invention find application.

In the UK, terrestrial television (TV) has traditionally been allocated a frequency band 470 MHz to 862 MHz. However, a switch to digital terrestrial TV (DVB-T/T2) has initially led a 790 MHz to 862 MHz band to be allocated to mobile telecommunications and LTE in particular. It is also likely that increasing amounts of spectrum below 790 MHz will be allocated to mobile telecommunications in the future. Implications of these changes in spectrum allocation are that it is not certain which frequencies will be allocated to terrestrial TV and mobile telecommunications in the future and that frequency allocations between countries will vary. Consequently, mobile telecommunications signals may be transmitted on frequencies which are adjacent to a frequency band on which TV signals are being transmitted or within a bandwidth a TV receiver is configured to receive TV signals over. Interference may therefore be caused to the reception of TV signals. Interference between TV signals and mobile telecommunications signals may also be exacerbated by decreasing guard bands between terrestrial TV frequency allocations and mobile telecommunications frequency allocations. Although predominantly an issue for over-the-air TV transmissions, changing frequency allocations are also likely to impact upon reception of cable TV transmissions (DVB-C etc.) due to overlapping mobile telecommunications and cable TV frequency allocations. For example, cables which are not adequately shielded from external signals may be susceptible to interference from mobile telecommunications signals.

A consequence of changing frequency allocations for terrestrial TV signals and mobile telecommunication signals is that mobile telecommunications signals may be transmitted on frequencies traditionally allocated to terrestrial TV signals. TV receivers may be required to receive TV signals across this traditional allocation because the location of TV signals may not be known. This therefore may result in TV receivers produced before a change in frequency allocation or not produced for specific frequency allocation receiving mobile telecommunications signals.

Reception of mobile telecommunications signals by a TV receiver is a result of a TV receiver's bandwidth or radio frequency passband not matching current terrestrial TV frequency allocations of a region the TV receiver is operating in. Reception of mobile telecommunications signals by a TV receiver may result in in-band interference and/or out-of-band interference, both of which may decrease the reliability of TV channel detection. A number of scenarios may result in the aforementioned interference, some of which will now be described. Firstly, if frequency allocations for terrestrial TV signals and mobile telecommunications signals vary between adjacent geographical regions, interfering mobile telecommunications signals may be present on frequencies allocated to terrestrial TV, thus causing in-band interference. Secondly, if guard bands between terrestrial TV and mobile telecommunications spectrum allocations are too small to allow adequate roll-off of pass band transmit filters, mobile telecommunications signals may be present on frequencies which TV signals are also present, thus causing in-band interference. The term roll-off relates to electronic filtering and defines a rate at which signal attenuation produced by a filter changes, most commonly with frequency, after the filter's cut-off point. Thirdly, if high power mobile telecommunications signals are present on frequencies close to or within the bandwidth of a TV receiver, interference may result. For instance, if the high power mobile telecommunications signals reach a low noise amplifier they may cause the low noise amplifier to distort the RF signal. This is because the RF input signal may exceed the maximum input power for the low noise amplifier and/or a tuner of the receiver, thus causing them to act in a non-linear fashion. These non-linear effects may cause out-of-band interference and reduce TV signal detection reliability on all frequencies within a TV receiver's bandwidth. This phenomenon is also referred to as blocking or saturation of a front end of a receiver and represents a problem even when mobile telecommunications signals and TV signals are not transmitted on a same frequency channel.

As result of the aforementioned problems, particularly out-of-band interference, it is desirable that mobile telecommunication signals and other interfering signals do not impact upon reception of terrestrial TV signals. Therefore is it desirable to provide an arrangement that can stop mobile telecommunications signals, such as LTE signals, and other interfering signals from impacting upon terrestrial TV signal reception.

FIG. 1 provides a simplified diagram of an example scenario in which embodiments of the present invention find application. A terrestrial TV network 100 and a 3GPP Long Term Evolution (LTE) mobile telecommunications network 110 operate in the same geographical area. A core terrestrial TV network 101 distributes terrestrial TV signals to one or more TV transmitters 102 that broadcast the terrestrial TV signals wirelessly to a TV set 103 which is configured to receive and detect signals over a predetermined radio frequency bandwidth traditionally allocated to terrestrial TV networks. The LTE network includes LTE user equipment (UE) 111 which wirelessly transmits and receives LTE telecommunications signals from and to one or more LTE base stations 112, the base stations being connected to a core LTE network 113. The core LTE network operates in accordance with LTE principles known in the art and comprises a serving-gateway 114, a mobility management entity 115 and a packet data network-gateway 116.

Figure 2:
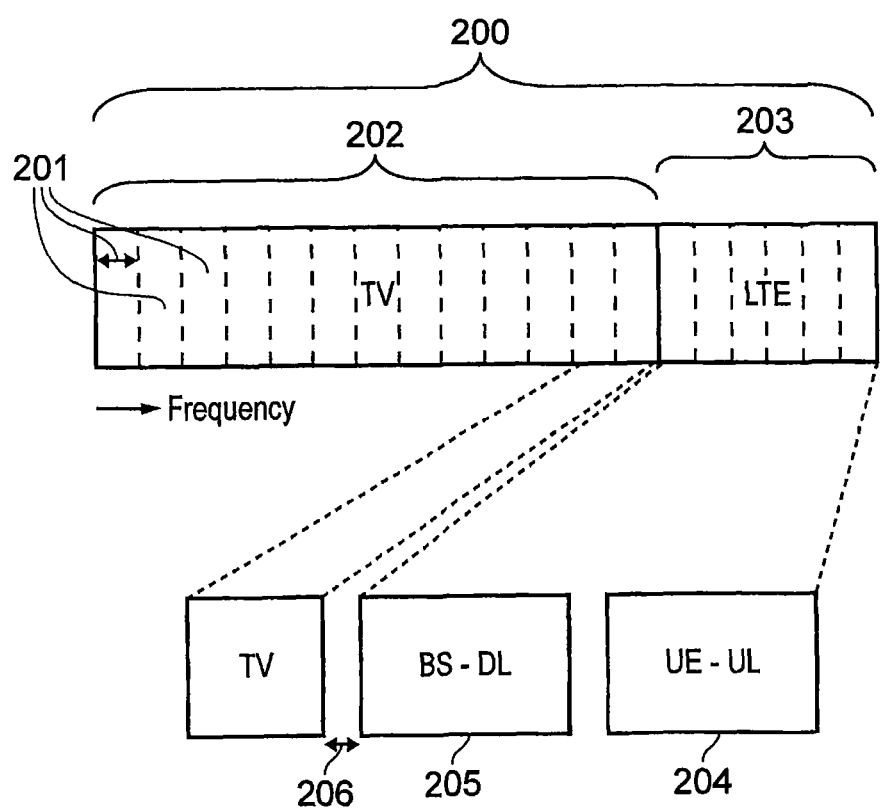
FIG. 2 provides a simplified diagram of an example allocation of radio frequencies for the terrestrial TV network and the LTE network of FIG. 1.

FIG. 2 provides a simplified diagram of an example allocation of radio frequencies to the terrestrial TV network 100 and the LTE network 110. Although not specific to a particular frequency allocation, the allocations in FIG. 2 are comparable to frequency allocations in Europe once spectrum freed up by a transfer from analogue to digital terrestrial TV has been reallocated to LTE networks. However, allocation of frequencies to the terrestrial TV network 100 and the LTE network 110 may vary.

A predetermined bandwidth 200, which has been traditionally allocated to terrestrial TV networks and terrestrial TV signals, comprises a plurality of frequency channels 201 where one or more of the plurality of frequency channels 201 provides TV signals which communicate TV channels.

The term TV channel as used herein is used in a conventional sense to mean signals which provide a video/audio representation of content for reproducing the content to a user. The TV signals may also communicate TV channel service information (SI), which may specify the location in frequency of the transmitted TV channels. Each of the frequency channels 201 may be numbered and have a fixed bandwidth. For example, in the UK the plurality of frequency channels are numbered from 21 to 69 and have a bandwidth of 8 MHz each, thus giving a predetermined bandwidth of 392 MHz. The TV set receives a bandwidth which corresponds to the predetermined bandwidth 200 such that it is operable to receive TV signals provided by the plurality of frequency channels 201. The receiver is also operable to detect the TV channels communicated by the TV signals.

Within the predetermined bandwidth 200 the terrestrial TV network 100 is allocated a TV bandwidth 202 comprising one or more frequency channels 201 to transmit TV signals. Also within the predetermined bandwidth the LTE network 110 is allocated an LTE bandwidth 203 comprising one or more frequency channels 201 to transmit LTE signals. The LTE bandwidth 203 comprises one or more frequency channels 201 within the predetermined bandwidth 200 which have not been allocated to the terrestrial TV network 100. Consequently, the predetermined bandwidth 200 and the LTE bandwidth 203 overlap in the frequency domain. The overlapping of the predetermined bandwidth 200 and the LTE bandwidth 203 results in LTE telecommunications signals being transmitted over frequencies which have traditionally been allocated to terrestrial TV networks. The TV 103 will therefore receive both terrestrial TV signals and LTE signals although they are not transmitted on common frequency channels.

Also shown in FIG. 2 an example transition between the TV bandwidth 202 and the LTE bandwidth 203 is shown in more detail. The LTE bandwidth 203 is divided into an uplink channel 204 and a downlink channel 205 LTE such that frequency division duplex LTE signals are transmitted by the LTE network 110. The uplink channel 204 and downlink channel 205 are separated in frequency and the downlink channel 205 is allocated a lower frequency bandwidth than the uplink channel 204. Although in this example frequencies within the LTE bandwidth are arranged to enable frequency division duplex LTE, frequencies within the LTE bandwidth 203 may be arranged to enable the implementation of any form of LTE transmission known in the art. A frequency gap 206, also known as a guard band, between the bandwidths allocated to the terrestrial TV network 100 and the LTE network 110 allows for the roll-off of their respective signals in order to avoid in-band interference. However, the guard band 206 is small compared to the allocated bandwidths 202 and 203 in order to minimise frequencies which are not utilised for useful data transmission. For example, in the UK the guard band is approximately 1 MHz.

FIG. 3 provides two further examples of simplified frequency allocations of the terrestrial TV network 100 and the LTE network 110 and their respective signals.

Figure 3A:
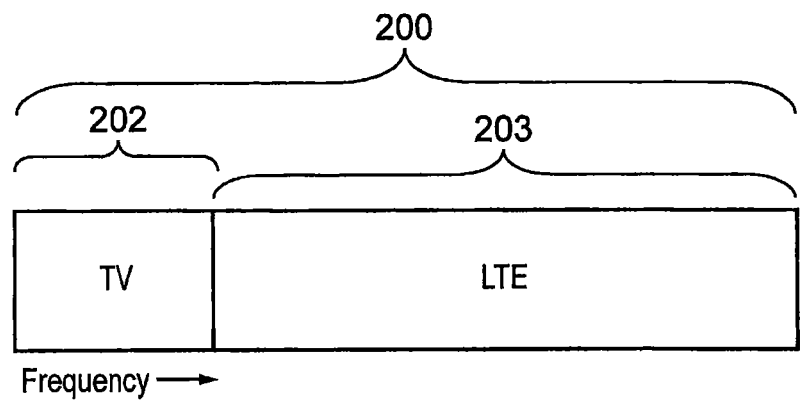
FIG. 3A to 3B provide simplified further example allocations of radio frequencies for the terrestrial TV network and the LTE network of FIG. 1.

FIG. 3A illustrates an example where a majority of the predetermined bandwidth 200 is allocated to the LTE network 110.

Figure 3B:
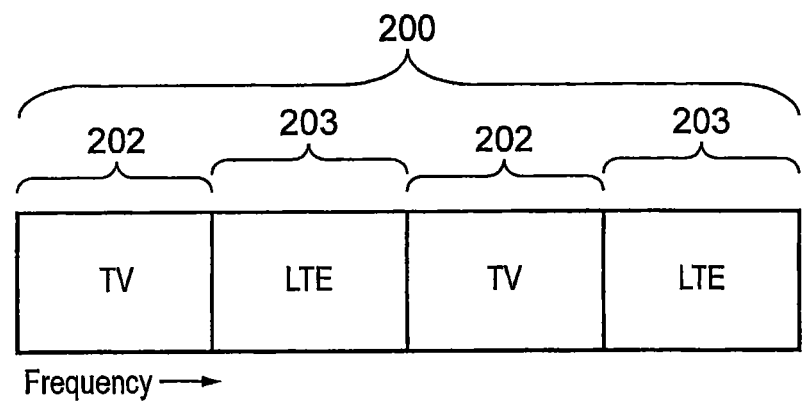

FIG. 3B illustrates an example where non-contiguous portions of the predetermined bandwidth 200 are allocated to LTE network 110. In FIGS. 3A to 3B frequencies allocated to LTE telecommunications signals overlap with the predetermined bandwidth and therefore the TV 103 will receive both terrestrial TV signals and LTE telecommunications signals.

FIG. 4 provides three simplified examples of received radio frequency signals in the frequency domain at the TV set 103 when the LTE 110 network is allocated frequencies within the predetermined bandwidth 200.

Figure 4A:
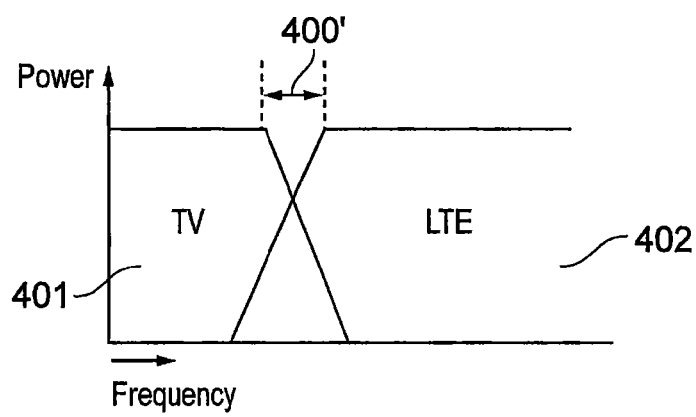
FIG. 4A to 4C provide simplified diagrams of example radio frequency signals received by the TV set of FIG. 1.

FIG. 4A provides an example where a guard band 400 between frequency allocations for the TV network 100 and the LTE network 110 is insufficient to allow for roll-off of TV signals 401 and LTE signals 402. As a result of the insufficient guard band 400, portions of the TV signals 401 and LTE signals 402 comprising their roll-off overlap and therefore cause in-band interference to the TV signals 401.

Figure 4B:
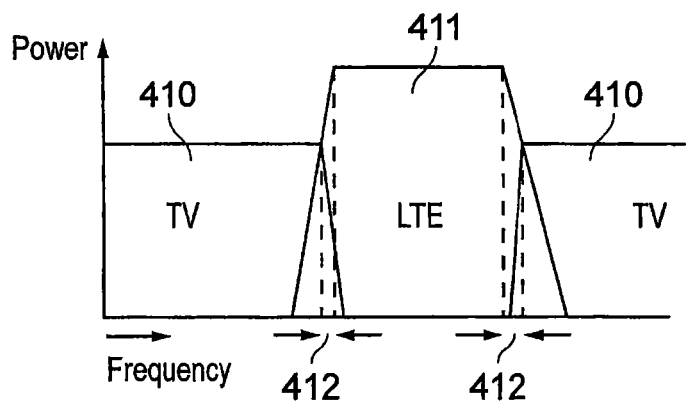

FIG. 4B provides an example where the LTE network 110 has been allocated frequencies such that TV signals 410 are located non-contiguously in the frequency domain. Guard bands 412 between frequencies allocated to the LTE network 110 and the TV network 100 are insufficient to allow for signal roll-off and therefore in-band interference will result due to the overlap of TV signals 410 and LTE signals 411.

Figure 4C:
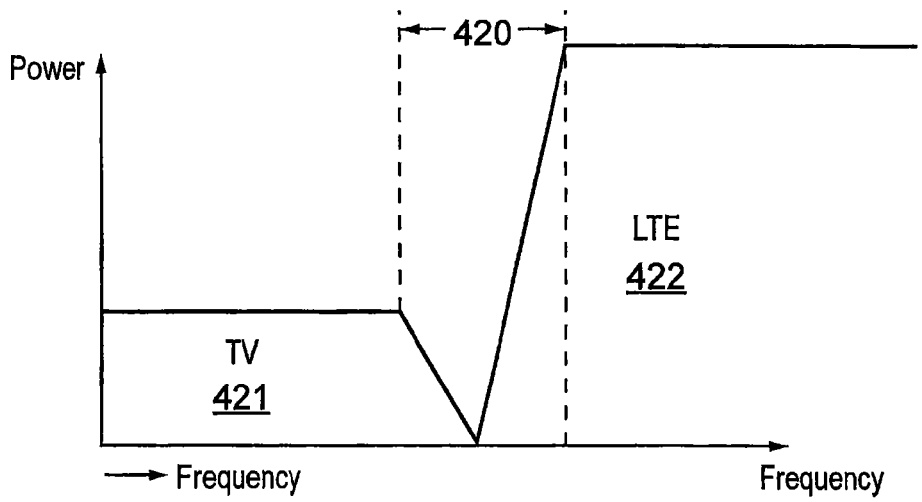

FIG. 4C provides an example where a guard band 420 between frequency allocations for the TV network 100 and the LTE network 110 is sufficiently large such that TV signals 421 and the LTE signals 422 do not overlap and no in-band interference results. However, the LTE signal 422 is received at a significantly higher power compared to that of the TV signal 421. This difference in power may occur when a TV set receiving TV signals is significantly closer to a transmitter of LTE signals than a transmitter of TV signals. Reception of TV signal 421 and LTE signal 422 illustrated in FIG. 4C may result in out-of-band interference because the high power LTE signal 422 will cause a low noise amplifier to introduce non-linear effects and block the front end of a TV receiver as previously mentioned.

Figure 5A:
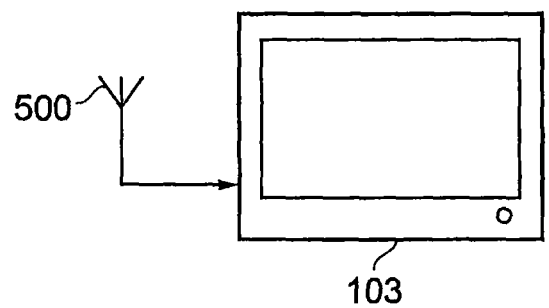
FIGS. 5A to 5B provide simplified diagrams of a convention TV set and the structure of a conventional TV receiver.

FIG. 5A provides an example of the TV set 103. The TV set 103 is connected to an antenna 500 which provides a radio frequency (RF) signal to an input on the TV set 103. The antenna is operable to receive a bandwidth approximately equal to the predetermined bandwidth 200 such that it receives an RF signal corresponding to the signal diagrams and frequency allocation diagrams of FIGS. 2 to 4.

Figure 5B:
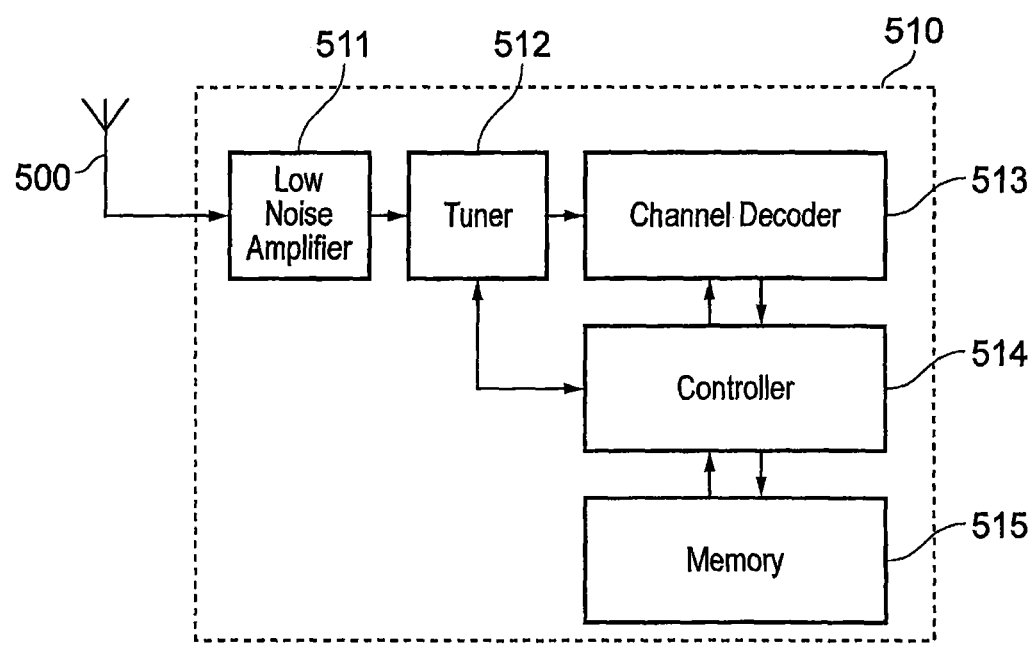

FIG. 5B provides an example structure of a receiver 510 in the TV set 103. The receiver 510 is configured to receive TV signals transmitted over the predetermined bandwidth 200 and detect the TV channels that the TV signals communicate. The receiver 510 comprises an input for receiving an RF signal, a low noise amplifier 511, a tuner 512, a channel decoding unit 513, a controller 514 and a memory 515. The low-noise amplifier 511 is configured to amplify an input RF signal such that the tuner 512 and other components are able to detect the TV signals and the TV channels they communicate. The controller 514 is operable to form a channel map of TV channels detected by the tuner 512 and store the channel map in the memory 515 so that a user can make channel selections. The controller 514 also provides appropriate control signals to configure the tuner 512, channel decoder 513 and memory 515 to perform TV channel detection in accordance with methods known in the art.

The receiver 510 is configured to receive signals across substantially the whole of the predetermined bandwidth 200, such as those illustrated in FIGS. 4A to 4C. Therefore the receiver 510 may receive both TV signals and LTE signals. The reception of LTE signals in addition to TV signals may cause in-band interference and out-of-band interference. For example, the radio frequency signals depicted in the FIGS. 4A and 4B contain in-band interference between the TV signal 401 and the LTE signal 402 and therefore reliable TV channel detection may not be possible on frequency channels where overlapping of the TV signal 401 and the LTE signal 402 occurs. The radio frequency signal depicted by FIG. 4C is likely to cause out-of-band interference due to the significantly higher power of the LTE signal 422 compared to the TV signal 421. When an RF signal similar to the one depicted by FIG. 4C is input into the low noise amplifier 511 the high power signal will cause the low noise amplifier 511 to introduce non-linearities into the RF signal because the input power may cause the low amplifier 511 to approach saturation. These non-linearities distort the RF signal across the whole predetermined bandwidth 200 such that the reliability of TV channel detection will be reduced. As previously mentioned this phenomenon is known as the 'blocking' of the front end of the receiver and causes significant interference even though no TV channels are present on the frequency channels LTE signals are transmitted on.

Due to uncertain future terrestrial TV frequency allocations, TV receivers are required to receive and detect TV signals and TV channels across the entirety of the predetermined terrestrial TV bandwidth 200. However, as outlined above, the predetermined bandwidth may comprise LTE signals and the resulting in-band and out-of-band interference will hinder TV channel detection. In-band interference to TV signals is primarily a result of insufficient guard bands and/or the roll-off of LTE signals. Consequently, in-band interference can be lessened by improving transmit filtering at LTE transmitters and/or improving control over the transmit spectrum of the LTE signals. However, it is difficult to control out-of-band interference in such a manner because it is a result of TV receiver characteristics and the relative locations of TV sets and LTE transmitters. Therefore a means to suppress LTE interference, and predominantly out-of-band LTE interference, is required.

An existing approach intended to suppress LTE interference is to provide a discrete fixed external filter to users of TV sets which suppresses fixed frequency channels.

Figure 6:
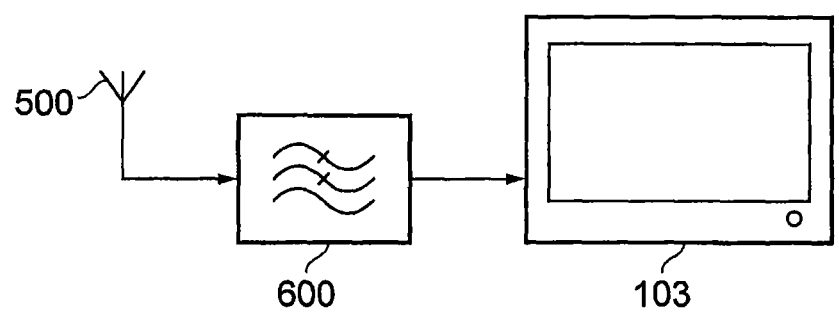
FIG. 6 provides a simplified diagram of a TV set according to the prior art.

FIG. 6 provides an illustration of the existing approach. However, this approach has a number of associated problems. Firstly, the discrete external nature of the filter requires an individual filter be placed in the RF signal path for each TV set. This requires discrete external filters to be distributed throughout the geographical region where interference between TV signals and LTE signals will occur and installation of the discrete external filter to be arranged for persons unable to perform installation themselves. These tasks will incur significant expense and it is not clear who will fund them or who shall be responsible for the logistics required to implement them i.e. persons running the terrestrial TV networks, persons running the LTE networks or a third party. Secondly, as previously mentioned, it is likely that the frequency allocations for terrestrial TV signals and LTE signals will vary in the future. Consequently, a new discrete external filter will be required for each change in frequency allocations. Thirdly, prior knowledge of the location of the TV signals and LTE signals is required to configure an external filter. Therefore the current approaches to suppress LTE interference are not satisfactory.

Figure 7:
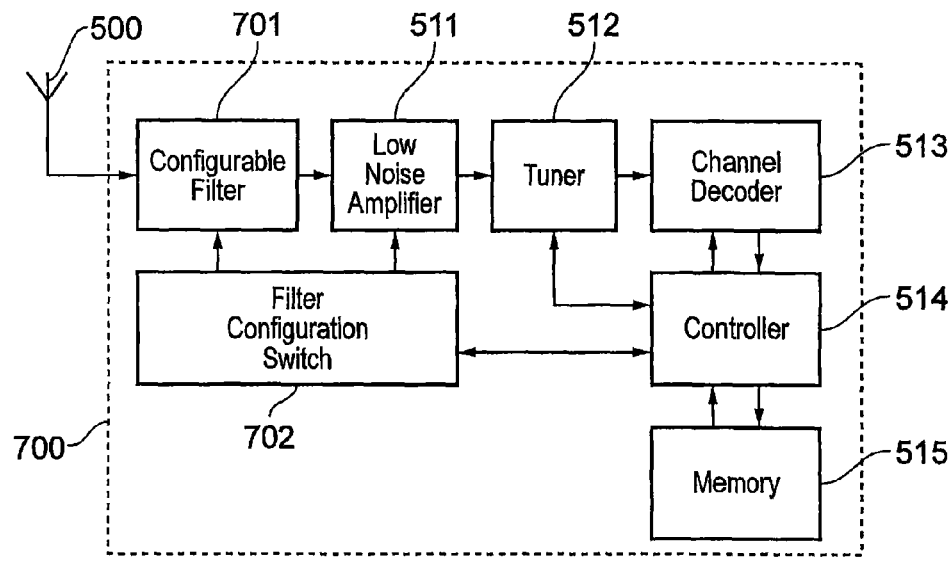
FIG. 7 provides a simplified diagram of a TV receiver comprising a configurable filter according to an example embodiment of the present invention.

FIG. 7 provides a diagram of a TV receiver 700 for receiving terrestrial TV signals over the predefined bandwidth 200 according to a first embodiment of the present invention. The TV receiver 700 comprises an input for receiving an RF signal from the antenna 500, the RF signal comprising terrestrial TV signals. The terrestrial TV signals comprise a plurality of frequency channels 201 within a predetermined bandwidth 200 which provide TV signals which communicate TV channels. Within the receiver 701 the RF signal first passes through a configurable filter 701 such that signals received from frequencies within the RF signal corresponding to a stop-band of the configurable filter 701 are suppressed. The filtered signal is then subsequently input into the low-noise amplifier 511, the tuner 512 and the channel decoder 513 of the TV receiver 700 where these components are operable to detect the TV channels in accordance with methods well known in the art as previously described. The configurable filter 701 is operable to suppress signals received from one or more of the plurality of frequency channels 201 within the predetermined bandwidth 200 such that the power of the signals on the suppressed frequency channels are output from the configurable filter 701 at a significantly reduced power. The receiver 700 also comprises a controller 514 which is operable to configure the common receiver components (511 to 515) to detect TV channels and form a channel map of detected TV channels. In some embodiments the controller 514 may be a micro controller which for example may include a processor and a memory. However, the controller 514 is further operable to configure the configurable filter 701 via a filter configuration switch 702 to suppress signals received from frequency channels upon which no TV channels have been detected by the tuner. This suppression results in signals received from frequency channels upon which no TV channels have been detected being received by the low-noise amplifier 511 and tuner 512 at a significantly reduced power. In some embodiments configurable filters may comprise tuneable digital capacitors.

This embodiment suppresses LTE signals such that LTE signals do not hinder the detection of TV channels on frequency channels within the predetermined bandwidth 200. The presence of LTE signals on a frequency channel is inferred based on the presumption that if a TV channel is not detected on a frequency channel, interference is present on the frequency channel. Consequently, if a TV channel is not detected on a chosen frequency channel the controller 514 infers the presence of an LTE signal on the chosen frequency channel and configures the configurable filter 701 to suppress signals on the chosen frequency channel. Advantageously, this embodiment does not require the detection of LTE signals themselves and therefore may suppress LTE signals when their location and characteristics are unknown.

As a consequence of the operation of this embodiment, signals received on frequency channels upon which interfering LTE signals are present are suppressed such that the interfering LTE signals are received by the low-noise amplifier 511 and tuner 512 at a significantly reduced power. This may ensure that the low-noise amplifier 511 operates correctly and does not introduce significant distortions into the RF signals and thus does not lead to out-of-band interference. This in turn ensures the tuner 512 is able to detect TV channels on frequency channels which would experience out-of-band interference in a convention TV receiver.

The controller 514 and configurable filter 701 of this embodiment allow LTE signals or other interfering signals whose frequency may be unknown and which are possibly non-contiguous in frequency to be suppressed. This feature overcomes the need for a number of external filters with fixed characteristics and ensures the TV receiver 700 is able to reliably detect TV channels throughout any changes to TV frequency allocations which may which may introduce LTE or other interferers into the terrestrial TV predetermined bandwidth 200.

This embodiment requires no information on the location, source or characteristics of interference since the necessary information is inferred from a failure to detect TV channels. Consequently, this embodiment is equally applicable to other interference sources as well as interference caused by LTE signals. For example, in a scenario similar to that shown in FIG. 3B, white spaces in the spectrum may exist between frequency channels on which TV signals are being transmitted. Accordingly, this embodiment may be used to suppress signals received in the white spaces, for example in both frequency channels adjacent (below and above) a frequency channel in which a TV signal is being transmitted. White spaces may be used by signals other than LTE and may equally cause out of band interference to the receipt of a TV channel being transmitted on frequency channel. Such other signals may be transmitted only at specific times in the white spaces, e.g. a certain time of day or periods in a week, or corresponding to particular events. Furthermore the signal format transmitted may vary with time.

This embodiment presents an elegant solution to the problem of TV receiver operation when unknown changes to TV frequency allocation and interferer frequency allocation occur in the future.

Furthermore, due to the placement of the configurable filter 701 and filter configuration switch 702 in the receiver and their utilisation of other standard existing receiver components (511 to 515), this embodiment may be fabricated in silicon as part of an on chip receiver and placed in TV sets at a relatively low cost. This enables the possible introduction of the embodiment into all TV sets and receivers distributed across a global region, for instance Europe, such that all TVs sets are able to detect TV channels even though terrestrial TV and LTE frequency allocations may vary.

In some embodiments the controller 514 may also be operable to configure the configurable filter 701 to suppress signals received on frequency channels based on other factors, for example, frequency channels specified by user input and frequency channels specified by service information (SI) communicated by the TV signals.

Figure 8:
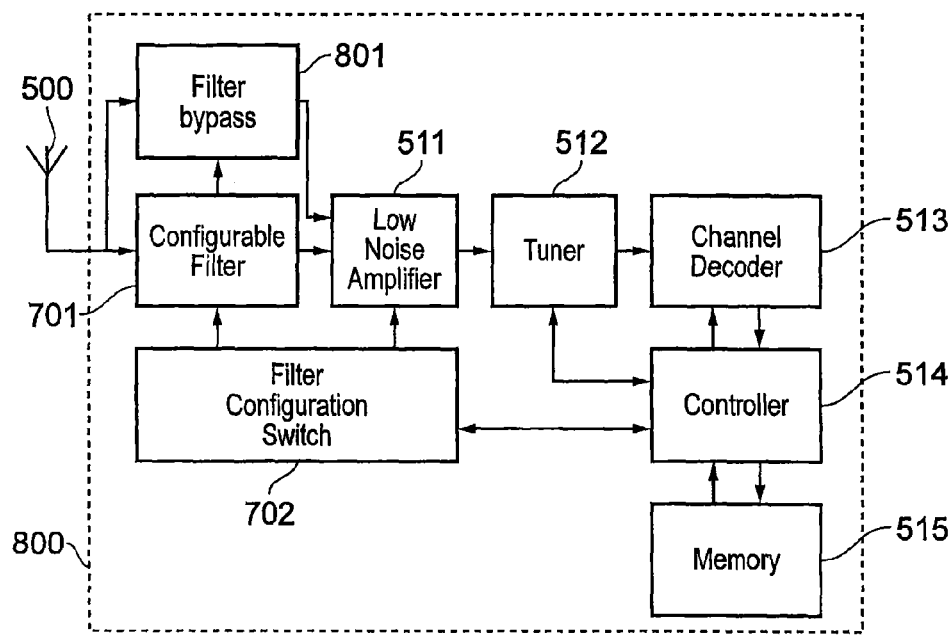
FIG. 8 provides a simplified diagram of a TV receiver comprising a filter bypass according to an example embodiment of the present invention.

FIG. 8 provides a diagram of a second embodiment of the present invention. In this embodiment a filter bypass 801, which is configurable by the controller 514 via the filter configuration switch 702, is included in the receiver 800 and the receiver 800 has substantially the same components as the receiver 700 (701,702 and 511 to 515). When applied the filter bypass 801 forms a signal path for the input RF signal to the low-noise amplifier 511 that bypasses the configurable filter 701 so that no signals received from the plurality of frequency channels 201 within the predetermined bandwidth 200 are suppressed. This embodiment allows a signal received on a frequency channel within the predetermined bandwidth 200 which may inferred as interference during normal operation of the first embodiment to pass to the low-noise amplifier 511 and tuner 512 of the receiver 800. Examples of such signals may include LTE signals for LTE enabled TV sets and RF signals from peripheral TV devices which utilise the RF input to transmit signals to a TV set. This embodiment also allows the configurable filter 701 to be bypassed if it were to malfunction and suppress signals received from frequency channels which provide TV signals.

Figure 9:
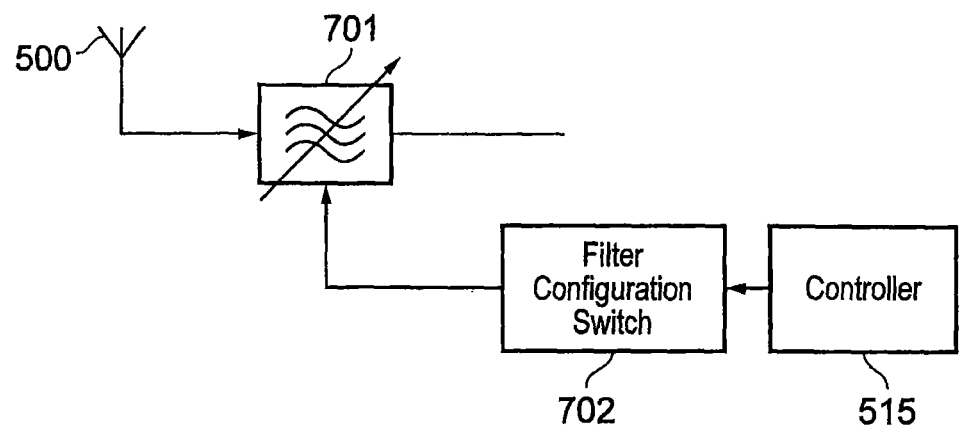
FIG. 9 provides a simplified diagram of the configurable filter of FIG. 7 when the configurable filter comprises an adaptive filter.

FIG. 9 provides an example implementation of the configurable filter 701 of the first and second embodiments. The configurable filter 701 is an adaptive filter whose characteristics are controlled by the controller 514 via the filter configuration switch 702. The adaptive filter is operable to provide low-pass, high-pass and multiple non-contiguous band-pass or stop-band filter characteristics. These characteristics are set by the controller 514 and correspond to frequency channels which the controller 514 wishes to suppress signal received from as a result of tuner failing to detect TV channels on these frequency channels. This implementation of the configurable filter 701 allows a single filter to be used to suppress LTE or other interfering signals whose position in the frequency domain may vary due to changes in frequency allocations over time and geographical region.

Figure 10:
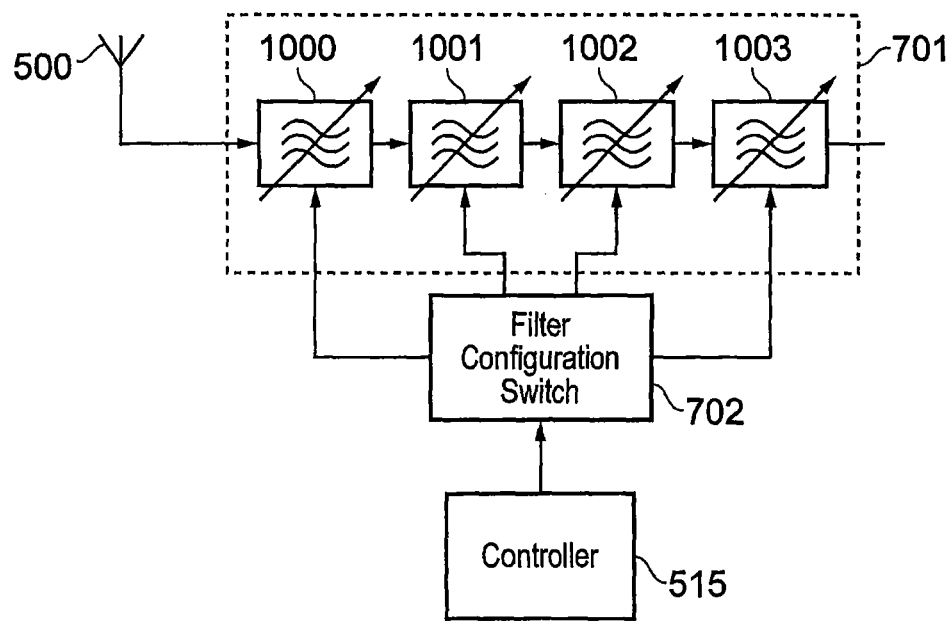
FIG. 10 provides a simplified diagram of the configurable filter of FIG. 7 when the configurable filter comprises a plurality of adaptive filters.

FIG. 10 provides a further example implementation of the configurable filter 701 of the first and second embodiments. The configurable filter 701 is comprised of one or more cascaded adaptive filters 1000 to 1003 whose characteristics are controlled by the controller 514 via the filter configuration switch 702. The component adaptive filters are operable to provide low-pass, high-pass and multiple non-contiguous band-pass or stop-band filter characteristics. These characteristics are set by the controller 514 and correspond to frequency channels which the controller wishes to suppress due to the failure of the tuner 512 to detect TV channels. For instance, in one embodiment each component filter may be configured by the controller 514 to have stop-band characteristics which correspond to a frequency channel upon which no TV channels were detected by the tuner 512. This implementation of the configurable filter 701 allows the suppression of a plurality of LTE or other interfering signals whose position in the frequency domain may be non-contiguous and vary due to changes in frequency allocations. Consequently, this implementation may also be suitable for scenarios where frequency allocations are dynamic.

Figure 11:
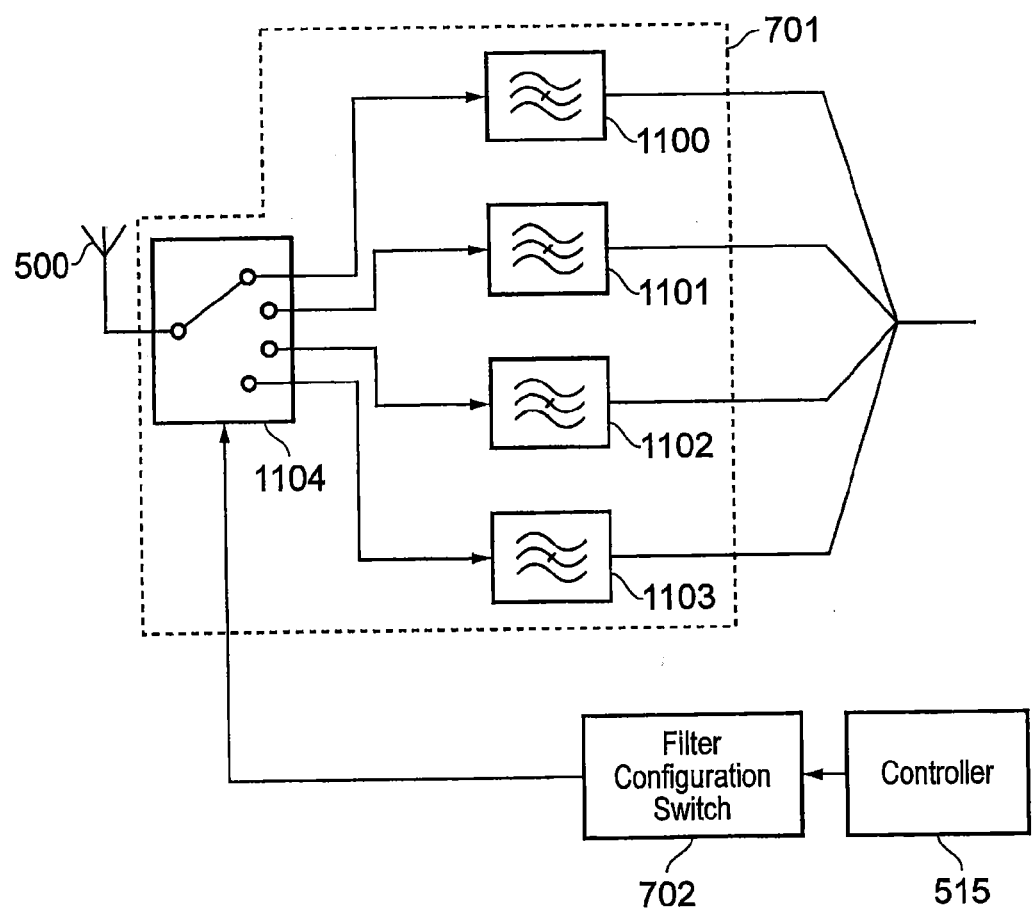
FIG. 11 provides a simplified diagram of the configurable filter of FIG. 7 when the configurable filter comprises a plurality of fixed filters.

FIG. 11 provides another further example of implementation of the configurable filter 701 of the first and second embodiments. In this example the configurable filter 701 comprises multiple component filters 1100 to 1103 whose characteristics are fixed and different, and an RF switch 1104 which is operable to form an RF signal path through any one of the component filters from the RF input to the low-noise amplifier 511. The configuration of the component filters is controlled by the controller 514 via the configuration switch 702. Each filter may have characteristics corresponding to a low-pass, high-pass, band-pass or stop-band filter. For example, in one embodiment each component filter may have pass-stop characteristics which correspond to one or more of the plurality of frequency channels 201 within the predetermined bandwidth 200. In another embodiment, the characteristics of a component filter selected for inclusion in an RF signal path by the controller 514 will correspond to one or more frequency channels upon which no TV channels have been detected by the tuner 512.

In a further embodiment an RF splitter may be utilised instead of the RF switch 1104 in order to simplify an implementation of the multiple component filters and reduce a cost of fabricating the present invention.

Figure 12:
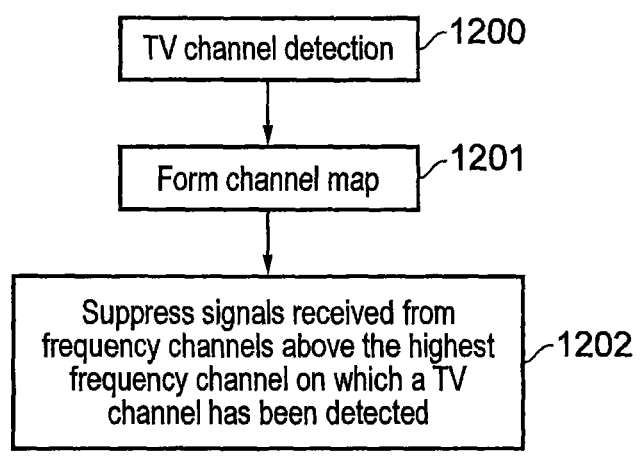
FIG. 12 provides a flow chart illustrating a method of configuring the configurable filter to suppress signals received from a contiguous block of frequency channels according to an example embodiment of the present invention.

FIG. 12 illustrates a method for configuring the configurable filter 701 of the previous embodiments. TV channel detection (step 1200) is initiated by the user of a TV set or automatically by the controller 514. Detection of TV channels within the predetermined bandwidth 200 is then performed by the tuner 512 channel decoder 513, memory 515 and controller 514 in accordance with any method known in the art. Upon completion of TV channel detection a channel map is formed by the controller 514 (step 1201) which represents detected TV channels. This channel map may be made available to the user of the TV set to enable the user to select desired TV channels or used internally by the controller 514. Once the channel map is formed the controller 514 configures the configurable filter 701 to suppress signals received from frequency channels within the predetermined bandwidth 200 above the highest frequency channel upon which a TV channel was detected (step 1202). As a result of the contiguous frequency channels supressed by this method, this embodiment can find application to frequency allocations such the one illustrated in FIG. 3A due the LTE signals being allocated a contiguous band of frequencies. In some embodiments the tuner 512 is configured to detect the TV channels on each of the plurality of frequency channels within the predefined bandwidth 200 sequentially beginning from either a highest or a lowest frequency in the predetermined bandwidth 200. The sequential detection of TV channels on frequency channels ensures TV channel detection is performed in a logical order. Furthermore, each time TV channel detection is performed on a frequency channel, signals which may comprise interference on frequency channels upon which TV channel detection has not been performed are suppressed. This therefore increases the probability that the tuner 512 will perform reliable TV channel detection when characteristics of interfering signals are unknown because frequency channels which may have interfering signals transmitted on them are suppressed prior to TV channel detection.

In some embodiments, the controller 514 may configure the configurable filter 701 to suppress signals received from the frequency channels above the highest frequency channel upon which a TV channel was detected (step 1202) before the formation of the channel map (step 1201). This method may also be preferred for the configuration of the configurable filter 701 when the LTE network 110 has been allocated a contiguous higher frequency portion of bandwidth within the predetermined bandwidth 200. For example, as illustrated in FIG. 3A.

Figure 13:
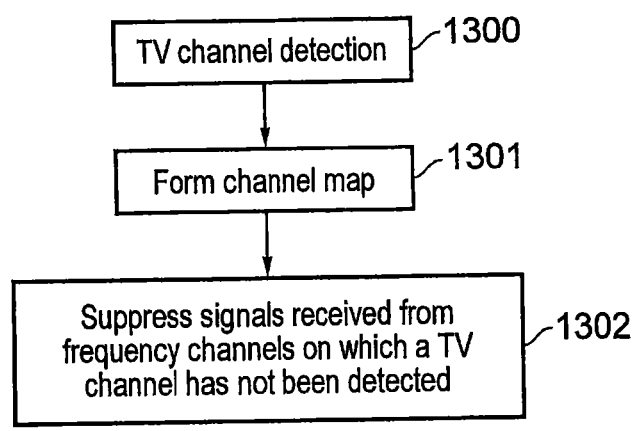
FIG. 13 provides a flow chart illustrating a method of configuring the configurable filter to suppress signals received from a non-contiguous blocks of frequency channels according to an example embodiment of the present invention.

FIG. 13 illustrates a further method for configuring the configurable filter 701 of previous embodiments. Steps 1300 and 1301 of this method are equivalent to steps 1200 and 1201 of the method illustrated in FIG. 13. However, at step 1302 the controller 514 configures the configurable filter 701 to suppress signals received from all frequency channels within the predetermined bandwidth upon which TV channels have not been detected. This method may be preferred for the configuration of the configurable filter 701 when the LTE network has been allocated multiple non-contiguous frequency bandwidths. For instance, the frequency allocation illustrated in FIG. 3B due to the LTE signals being allocated non-contiguous bands.

In some instances, terrestrial TV signals, in addition to TV signals and TV channels, may also comprise service information (SI) which can be interpreted by the controller 514. The SI may comprise information on TV channels provided by the frequency channels within the predetermined bandwidth 200, the size of the predetermined bandwidth 200 and the location of TV channels on frequency channels within the predetermined bandwidth 200.

Figure 14:
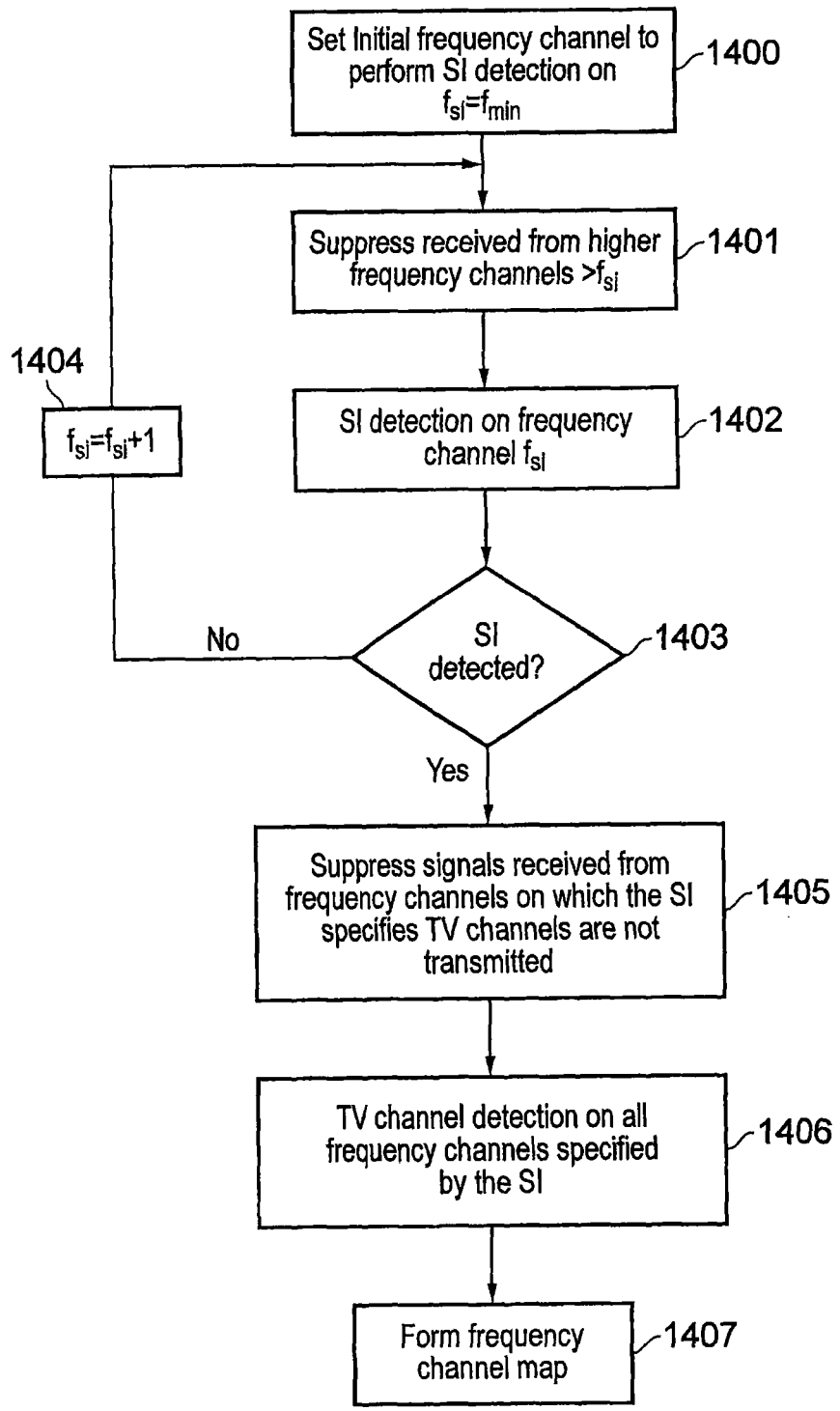
FIG. 14 provides a flow chart illustrating a method of configuring the configurable filter when system information is present in TV signals according to an example embodiment of the present invention.

FIG. 14 illustrates a method for configuring the configurable filter 701 of the previous embodiments when SI is present in the terrestrial TV signal. Initially a lowest frequency channel $f_{min}$ within the predetermined bandwidth 200 is chosen for SI detection (step 1400). A current frequency channel upon which SI detection is to take place is represented by a frequency channel index $f_{si}$ and SI detection is performed in accordance with methods known in the art. The controller 514 configures the configurable filter 701 to suppress signals received from all frequency channels above $f_{si}$ which are within the predetermined bandwidth 200 (step 1401). SI detection (step 1402) is then performed on frequency channel $f_{si}$ and if SI is detected (step 1403) the controller 514 configures the configurable filter 701 to suppress signals received from all frequency channels upon which the SI does not specify TV channels are being communicated (step 1405). A detection of TV channels which the SI has specified (step 1406) is then performed and a channel map formed (step 1407) by the controller 514. If the SI is not detected (step 1403) on frequency channel $f_{si}$ then SI detection is subsequently performed on an adjacent frequency channel $f_{si}+1$ and the controller 514 configures the configurable filter 701 to suppress signals received from higher frequency channels. This process continues until the SI is detected such that SI detection is performed on frequency channels sequentially. This method ensures that detection of TV channels occurs when signals received from frequency channels which do not provide TV signals are suppressed, thus reducing the chance of the low-noise amplifier and tuner being blocked/saturated by high power interferers. The methods illustrated by FIGS. 12 and 13 do not pre-emptively suppress signals received from frequency channels and are therefore susceptible to blocking/saturation of the low-noise 511 amplifier and the tuner 512 by LTE signals on frequency channels within the predetermined bandwidth 200 upon which TV channel detection has yet to take place.

In a further example method for the configuration of the configurable filter 701 when SI is present in the terrestrial TV signal, upon detection and reception of the SI the controller 514 configures the configurable filter 701 to suppress signals received from all frequency channels within the predetermined bandwidth 200 which are higher than the highest frequency channel upon which the SI specifies TV channels are being transmitted. TV channel detection is then subsequently performed. This method enables reliable detection of TV channels when LTE signals are allocated a contiguous frequency bandwidth above the band of frequencies allocated to terrestrial TV signals whilst not performing TV channel detection prior to the configuration of the configurable filter 701.

In another example SI detection is performed on a frequency channel once the controller 514 has configured the configurable filter 701 to suppress signals received from all other frequency channels within the predetermined bandwidth.

Figure 15:
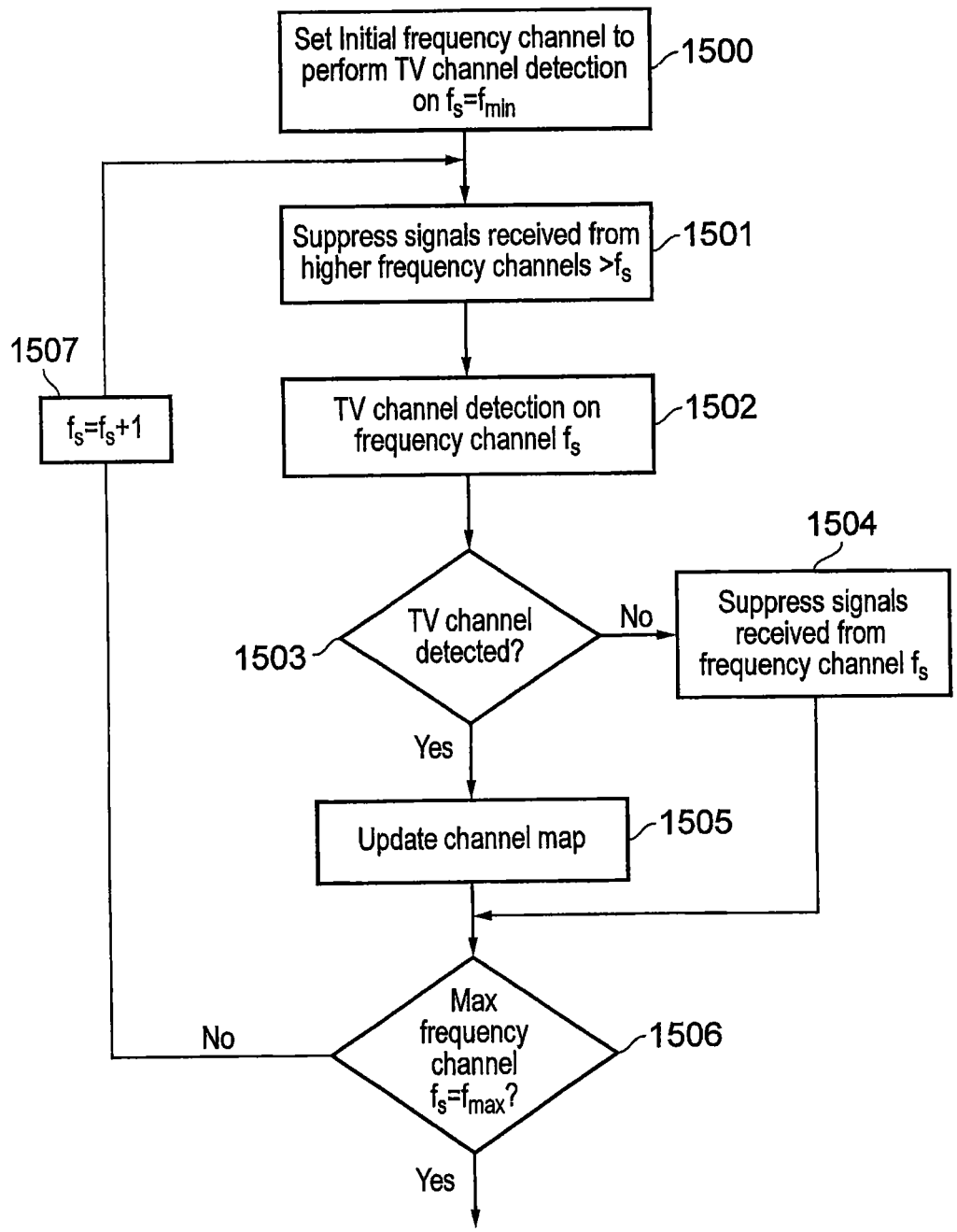
FIG. 15 provides a flow chart illustrating a method of configuring the configurable filter to suppress signals received from frequency channels sequentially according to an example embodiment of the present invention.

FIG. 15 illustrates a method for configuring the configurable filter 701 of previous embodiments. Initially a lowest frequency channel $f_{min}$ within the predetermined bandwidth 200 is chosen to perform TV channel detection upon (step 1500). A current frequency channel upon which TV channel detection is to take place being represented by channel index $f_s$. The controller 514 then configures the configurable filter 701 to suppress signals received from all frequency channels above $f_s$ which are within the predetermined bandwidth 200 (step 1501) before configuring the tuner 512 to perform TV channel detection on frequency channel $f_s$ (step 1502). If a TV channel is detected on channel $f_s$ (step 1503) a channel map is updated (step 1505). Then subject to a maximum frequency channel not being reached (step 1506), the channel index is incremented (step 1507) and TV channel detection performed on an adjacent channel $f_s+1$ whilst the configurable filter 701 is configured by the controller 514 to suppress signals received from one or more higher frequency channels. If a TV channel is not detected (step 1503) on channel $f_s$, the controller configures the configurable filter 701 to permanently suppress signals received from frequency channel $f_s$ (step 1504) in additional to any frequency channels which are currently suppressed. Subject to the maximum frequency channel not being reached (step 1506), the channel index is incremented (step 1507) and TV channel detection performed on the adjacent channel $f_s+1$ whilst the configurable filter 701 is configured by the controller 514 to suppress signals received from higher frequency channels. This method ensures that detection of TV channels is performed sequentially over the frequency channels 201 whilst frequency channels upon which TV channel detection has not been performed are suppressed. This approach reduces the chance of the low-noise amplifier 511 and tuner 512 being blocked/saturated by high power interferers as illustrated in FIG. 4C whilst being able to suppress contiguous and non-contiguous LTE interference. Furthermore, unlike the example method illustrated in the FIG. 14, SI is not required.

According to some embodiments the tuner is configured by the controller to periodically detect the TV channels communicated on the plurality of frequency channels. The controller then periodically updates the channel map and the frequency channels the configurable filter is configured to suppress.

The periodic detection of TV channels may ensure that if frequency allocations for TV signals or interfering signals change, frequency channels selected for suppression and the channel map of detected TV channels are updated accordingly. This is advantageous because it provides the receiver with an ability to adapt the frequency channels upon which signals are suppressed when frequencies allocated for TV signals and interfering signals are dynamically allocated or change.

In further embodiments, methods illustrated in FIGS. 12 to 15 which perform TV channel detection, configurable filter 701 configuration and channel map formation may be repeated periodically or when certain criteria are met. For instance, the methods may be repeated when a user requests a channel map to be updated, upon the expiry of a predetermined period, if a TV signal is no longer detected, when SI communicates a relevant command or when frequency allocations change. This process of repeated detection may ensure an up to date channel map is maintained and any new interference from LTE signals or other interferers is suppressed.

In some circumstances terrestrial TV signals transmitted from multiple terrestrial TV transmitters 102 may be present in an RF signal input into the receiver 700. Consequently, TV channel detection may result in duplicate channels or regional variations of a same TV channel. In some embodiments the LTE 701 filter may also be configured by the controller 514 to suppress signals received from frequency channels that communicate duplicate TV channels. The suppression of these frequency channels may be specified by a user or performed automatically by the controller 514. For example, the controller 514 may be configured to suppress signals received from frequency channels which provide duplicate TV channels which have been received at the lowest power.

The methods illustrated by FIGS. 12 to 15 and the accompanying description disclose basic (FIGS. 12 to 13) and more robust (FIGS. 14 to 15) approaches to configure the configurable filter 701. However, these methods may be combined to form other methods of configuring the configurable filter 701 which fall within the scope of this disclosure.

In further embodiments information relating to a channel map or information representing a channel map may be received via a signal other than the TV signal and then processed by the controller. According to these embodiments information representing the channel map is received from signals transmitted via for example an internet connection in contrast to the controller forming and processing a channel map via TV channel detection. For example, a channel map or information representing a channel map may be received via the Internet via a wireless or wired network, such as Ethernet, Wi-Fi, Bluetooth, 3GPP LTE or other local or wide area network. To facilitate reception of the channel map through a communications channel other than the TV signal, the receiver may additionally include an interface module configured to communicate with non-terrestrial TV networks and communicate the received information to the controller. The resulting channel map may provide an indication of the frequency channels upon which non-useful signals are transmitted and or frequency channels upon which substantially no TV signals are transmitted. The controller may then configure the configurable filter to suppress signals received on these clear or non-useful channels in a similar manner to that described above. This approach may therefore obviate the need for systematic detection and suppression of TV and non-TV signals, respectively to form the channel map, thus reducing the time taken to configure the configurable filter and reducing the processing burden placed on the TV receiver.

Figure 16:
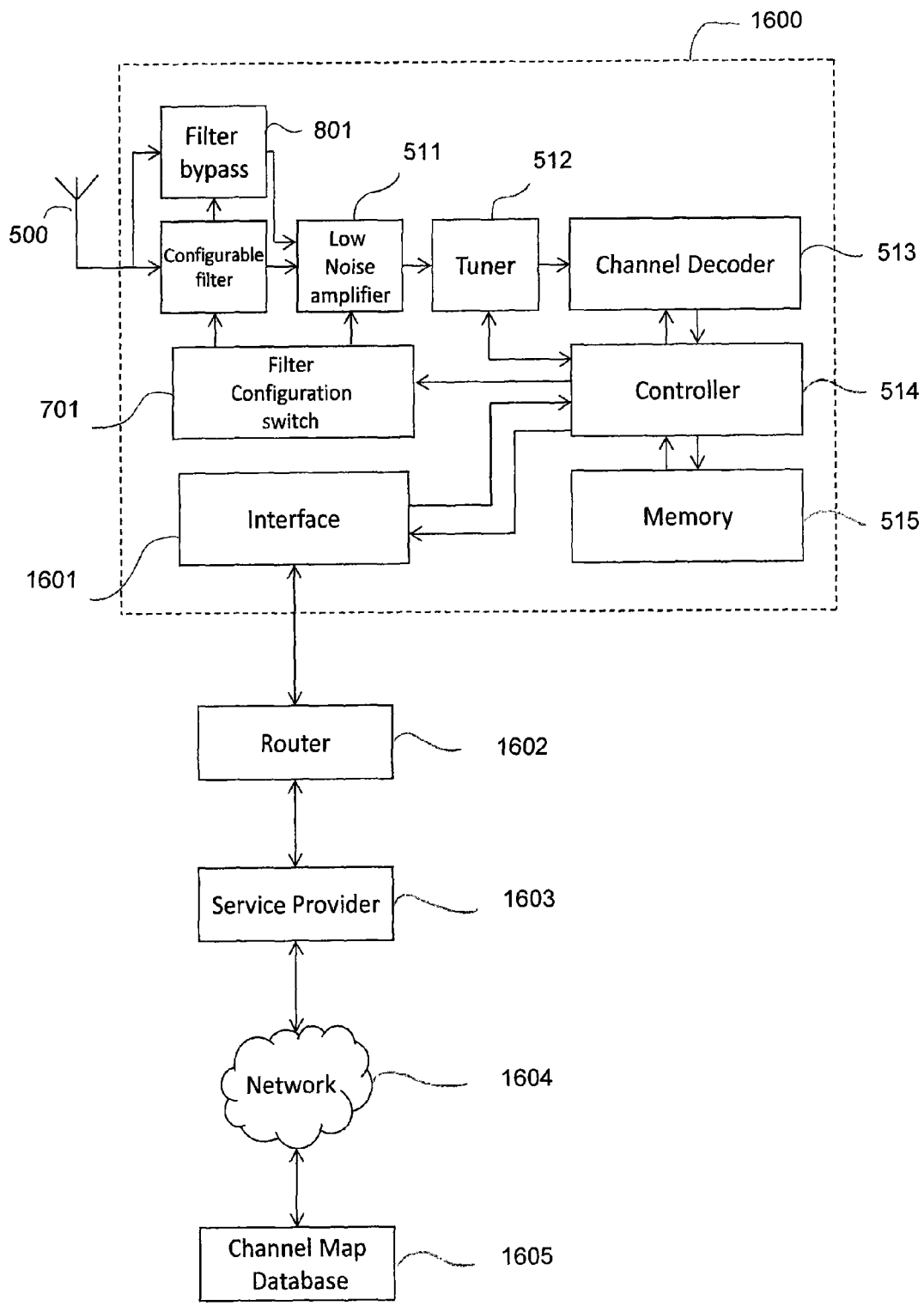
FIG. 16 provides a simplified diagram representing a TV receiver comprising a configurable filter according to an example embodiment of the present technique.

FIG. 16 provides an illustration of a receiver 1600 which is operable to obtain a channel map from an external wireless or wired communications network. The receiver is substantially similar to that described with reference to FIGS. 7 and 8, however, the receiver further comprises an interface module 1601 which is communicatively connected to the controller 514 and an external wireless network using an means known in the art. In the case of an Ethernet connection for example, the external wireless network may be formed from a router 1602, a service provider such as an internet service provider, and a core network 1604 which in turn is connected to a channel map database that stores the channel maps or information relating to channel maps. In some examples the router may be included in the receiver and in other examples the router may be a base station in a mobile communications network where the interface module is operable to communication with the base station. The channel map database may be a database maintained by an authority responsible for frequency allocations, a manufacture specific database or a database collaboratively maintained by television users and or television manufacturers for example. Providing a channel map in this manner may therefore allow an element of central control to be exercised on independent TV receivers. Although, in FIG. 16 the receiver is shown to include a filter bypass, the filter bypass may not be present in other embodiments.

In some embodiments, the receiver may store in memory 515 location information corresponding to its location such as a zip code or location information obtained from parameters of the television signals. In such examples the receiver may provide an indication of its location to the channel map database whereby a location specific channel map can be provided to the receiver via the interface. The IP address allocated to the receiver's connection to the Internet may also be used to determine its location for example, as may a GPS device or indoor positioning system. In other examples the channel map information may be filtered locally at the receiver according to the location information in order to tailor the channel map to the receiver's and therefore the television's location. In some scenarios a user of a television may find that in his or her particular location, terrestrial television broadcast signals are received from more than one transmitter. Accordingly the television may include a setting to allow selection of one transmitter. This selection setting may be used to filter a received channel map or provided to the channel map database in order to tailor the channel map communicated to the receiver.

In further embodiments the received channel map may be used to identify the frequency channels on which no TV signal is present and to configure the configurable filter to suppress signals received from those frequency channels. However, the receiver may also attempt to detect TV signals on the frequency channels which are indicated to be clear of useful signals by the channel map in order to verify the received channel map. For instance, frequency channels on which no TV signals are expected can be tuned to and if substantially no TV signal is detected the configurable filter can be configured to suppress signals received from the frequency channel. Should TV signals be detected in frequency channels where they are not expected to be present according to the channel map, the channel map may be updated and stored locally in memory and the filter may not be configured to supress signals from those frequency channels. In such situations an indication of the detected signals may also be provided to the channel map database in order to update the channel maps stored by the database.

Figure 17:
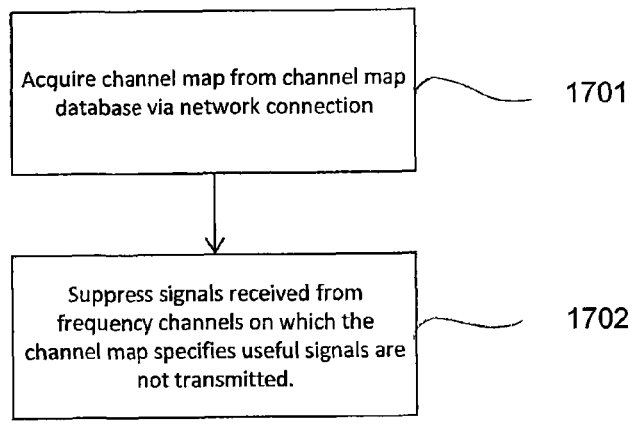
FIG. 17 provides a flow chart illustrating a method of configuring the configurable filter in accordance with an example embodiment of the present technique.

FIG. 17 provides a flow chart of an example procedure to obtain a channel map from a database via an external network and the Internet. At 1701 the controller acquires a channel map by requesting via the interface a channel map or information representing a channel map from the database. Once received the controller may then configure the configurable filter to supress signals received on channels that the channel map specifies useful signals such as TV signals should not be present.

Figure 18:
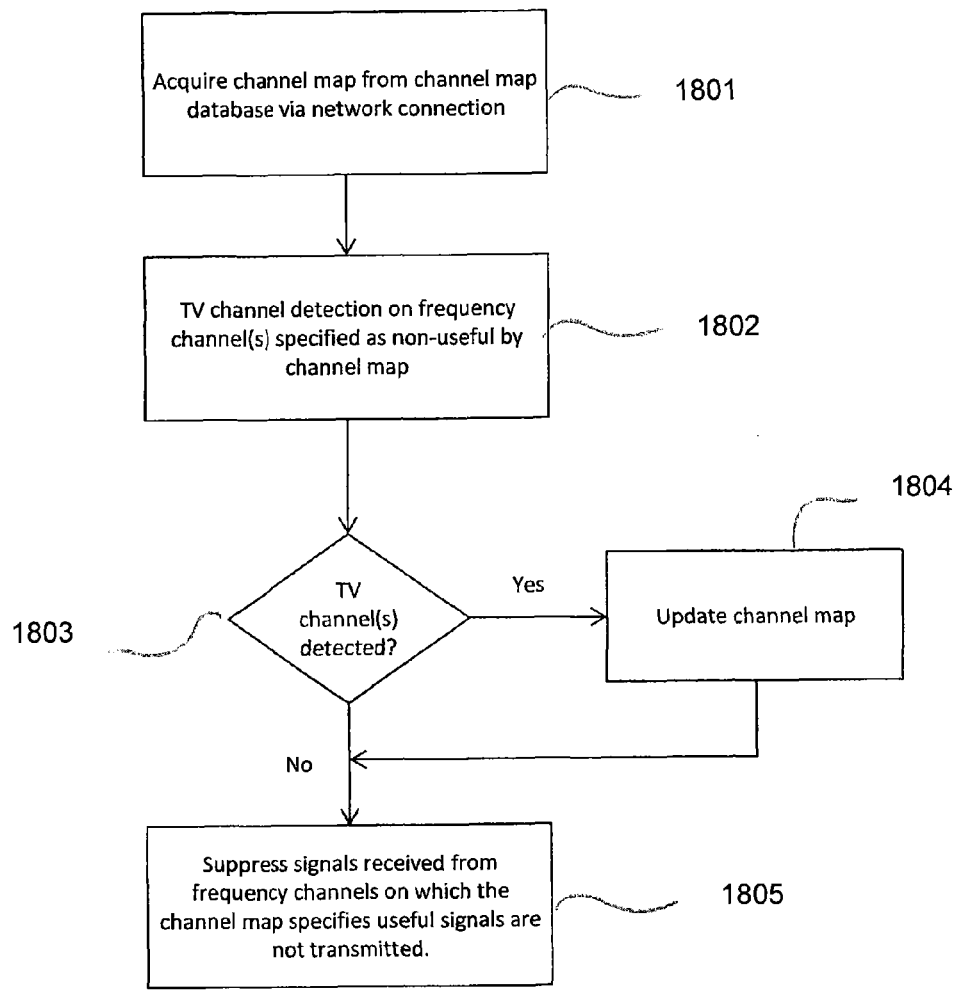
FIG. 18 provides a flow chart illustrating a method of configuring the configurable filter in accordance with an example embodiment of the present technique.

FIG. 18 provides a flow chart of an example procedure where the receiver verifies the channel map which has been received from the channel map database. Initially a channel map is acquired at 1801, TV channel detection 1802 is then performed on the channels specified as non-useful or where no TV channels are present by the channel map. If TV channels are detected 1803 by the receiver the channel map is updated locally and or centrally 1804 and then signals from the channel(s) upon which no useful signals are detected are suppressed by the configurable filter 1805.

The examples herein described may be useful when LTE or other mobile transmission signals are used in white spaces between frequency channels in the predetermined bandwidth in which TV signals are broadcast. Such transmissions may vary in time in order to increase the efficiency of resource allocation. For example, such signals may only be transmitted at certain times of day such as 6 pm-8 pm in a particular frequency channel. In these scenarios, a channel map received via a non-terrestrial TV signal such as an external wired or wireless network may be useful in that the filter may be configured to supress the signals in that frequency channel irrespective of the time of day at which the filter is configured. Accordingly, although such frequency channels may not be consistently in use, adjacent frequency channels on which TV signals are broadcast may be protected from interference during the 6 pm-8 pm period. The received channel map may also for example indicate that particular a frequency channel is occupied by a potential interferer only during the period 6 pm-8 pm. For example, LTE or other mobile transmission signals may timeshare a frequency channel with TV signals and a channel map may be used to change the configuration of the configurable filter for that frequency channel at the appropriate time defined by transmission time information in the channel map. Changes to the spectrum allocation of frequency channels are currently typically infrequent, but the channel map can be used to configure the filters at the point of change rather than requiring the user to manually retune and thus providing a flexible and convenient way to cope with spectrum changes.

In some embodiments the receiver may be configured to periodically acquire a channel map from the channel map database so that any changes to channel mapping can be promptly accounted for in the suppression provided by the configurable filter. In other embodiments, the television receiver may also comprise receiving capabilities for the "white space signals" (the LTE or other mobile transmission signals) and accordingly the configurable filter only supresses those signals when receiving television signals and suppresses those signals intended for the television signal receiving circuitry.

The embodiments and methods of the present invention have been described above with reference to TV channel detection. However, the embodiments and methods are equally applicable when detection of TV signals is considered and signals received from frequency channels suppressed when TV signals are not detected.

Various modifications may be made to the embodiments herein before described. Although embodiments of the invention have been described with reference to over the air broadcast terrestrial TV signals, embodiments of the present invention would also find application in the reception of cable TV signals and suppression of interference in the cable TV signals. The embodiments have also been described with reference to interference from LTE signals; however, the embodiments are equally applicable to other mobile communications standards and interferences sources which transmit signal within the predetermined bandwidth 200.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments. The disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

The invention claimed is:

1. A television receiver, the television receiver comprising an input for receiving a radio frequency signal comprising terrestrial television signals,
a tuner configured to detect the terrestrial television signals, the terrestrial television signals including a plurality of frequency channels within a predetermined bandwidth, the plurality of frequency channels providing television signals communicating television channels,
a configurable filter, the configurable filter being configurable to suppress signals received from one or more of the plurality of frequency channels within the predetermined bandwidth, and
controller circuitry operable to process a channel map of the television channels available for selection and, consequent upon a television channel not being present on a frequency channel, to configure the configurable filter to suppress signals received from the frequency channel.

2. The television receiver as claimed in claim 1, wherein the television receiver comprises a filter bypass circuitry configurable by the controller circuitry, the filter bypass circuitry being arranged to form a signal path for the input radio frequency signal to the tuner that bypasses the configurable filter such that no signals received from the predetermined bandwidth are suppressed.

3. The television receiver as claimed in claim 1, wherein the controller circuitry is arranged to configure the configurable filter to suppress signals received from one or more frequency channels that are adjacent to the frequency channel on which the tuner is currently configured to detect the television channels.

4. The television receiver as claimed in claim 1, wherein the television receiver comprises an interface configured to receive information representing the channel map via a signal other than that received through the input and to communicate the information representing the channel map to the controller circuitry, and the controller circuitry is arranged to configure the configurable filter to suppress signals received from frequency channels on which the channel map specifies television channels are not present.

5. The television receiver as claimed in claim 4, wherein said information representing the channel map comprises information corresponding to a current location of the television receiver.

6. The television receiver as claimed in claim 4, wherein the interface is configured to receive the information representing the channel map via an internet connection.

7. The television receiver as claimed in claim 5, wherein the tuner is configured, in response to a television channel not being detected on a frequency channel, to configure the configurable filter to suppress signals received from the frequency channel.

8. The television receiver as claimed in claim 1, wherein the terrestrial television signals include service information, the service information providing information specifying the frequency channels on which television channels are being transmitted, and the controller circuitry is arranged to receive the service information and configure the configurable filter to suppress signals received from frequency channels on which the service information specifies television channels are not being transmitted.

9. The television receiver as claimed in claim 1, wherein the tuner is configured by the controller circuitry to periodically detect the television channels communicated on the plurality of frequency channels such that the controller circuitry is arranged to periodically update the channel map and configure the configurable filter to suppress signals received from frequency channels on which a TV channel has not been detected.

10. A method for receiving terrestrial television signals, the method comprising
  receiving a radio frequency signal comprising the terrestrial television signals,
  detecting the terrestrial television signals, the terrestrial television signals including a plurality of frequency channels within a predetermined bandwidth, the plurality of frequency channels providing television signals communicating television channels,
  processing a channel map of the television channels available for selection, and
  configuring a configurable filter to suppress signals received from frequency channels upon which a television channel is not present in accordance with the channel map.

11. The method as claimed in claim 10, comprising configuring a filter bypass circuitry to form a signal path for the input radio frequency signal to the tuner that bypasses the configurable filter such that no signals received from the plurality of frequency channels are suppressed.

12. The method as claimed in claim 10, wherein the configuring the configurable filter includes configuring the configurable filter to suppress signals received from one or more frequency channels that are adjacent to the frequency channel on which the tuner is currently configured to detect the television channels.

13. The method as claimed in claim 10, comprising receiving via interface circuitry information representing the channel map via a signal other than the terrestrial television signal.

14. The method as claimed in claim 10, wherein the configuring the configurable filter includes detecting the television channels on each of the plurality of frequency channels within the predefined bandwidth sequentially, and configuring the configurable filter to suppress signals received from frequency channels upon which the detection of television channels has not been performed.

15. The method as claimed in claim 10, wherein the terrestrial television signals include service information, the service information comprising information specifying the frequency channel on which the television channels are being transmitted, the method comprising receiving the service information and the configuring the configurable filter includes suppressing signals received from frequency channels on which the service information specifies television channels are not being transmitted.

16. The method as claimed in claim 10, wherein the configuring of the configurable filter includes periodically detecting the television channels communicated on the plurality of frequency channels and periodically updating the channel map and the configurable filter to suppress signals received from frequency channels on which a television channel has not been detected.

17. A controller circuitry for controlling a television receiver, the television receiver comprising
  an input for receiving a radio frequency signal comprising terrestrial television signals,
  a tuner configured to detect the terrestrial television signals, the terrestrial television signals including a plurality of frequency channels within a predetermined bandwidth, the plurality of frequency channels providing television signals communicating television channels,
  a configurable filter, the configurable filter being configurable to suppress signals received from one or more of the plurality of frequency channels within the predetermined bandwidth,
  and the controller circuitry being arranged to:
  process a channel map of the television channels available for selection by a user of the television receiver, and
  configure the configurable filter to suppress signals received from a frequency channel consequent upon a television channel not being present on the frequency channel.

18. The controller circuitry as claimed in claim 17, wherein television receiver comprises an interface configured to receive information representing the channel map via a signal other than that received through the input and communicate the information representing the channel map to the controller circuitry, and the controller circuitry is arranged to configure the configurable filter to suppress signals received from frequency channels on which the channel map specifies television channels are not present.

19. A television receiver for receiving television signals, the television receiver comprising
  a tuner configured to detect television channels, the television channels being communicated by television signals provided on a plurality of frequency channels,
  a filter, the filter being configurable to suppress signals received from one or more of the plurality of frequency channels within the predetermined bandwidth, and
  a controller circuitry arranged to configure the filter to suppress a frequency channel consequent upon a television channel not being present on the frequency channel in accordance with the information representing a channel map of television channels available for selection.

20. The television receiver as claimed in claim 19, wherein the television receiver comprises an interface configured to receive the information representing the channel map and communicate the information representing the channel map to the controller circuitry.

21. The television receiver as claimed in claim 20, wherein the interface is configured to receive the information representing the channel map via a signal other than the television signals.

* * * * *